United States Patent [19]

Torrington

[11] 4,266,784
[45] May 12, 1981

[54] VIDEO DISC CADDY HAVING DISC ENTRAPMENT

[75] Inventor: Leslie A. Torrington, Indianapolis, Ind.

[73] Assignee: RCA Corporation, New York, N.Y.

[21] Appl. No.: 98,254

[22] Filed: Nov. 28, 1979

[51] Int. Cl.³ .................. G11B 5/82; G11B 25/04; B65D 85/30
[52] U.S. Cl. .................... 369/77; 206/312; 206/444; 358/128.5; 360/133
[58] Field of Search ............ 274/9 B, 23 A; 360/86, 360/97, 98, 99, 133; 358/128.5, 128.6; 206/444, 309, 312

[56] References Cited

U.S. PATENT DOCUMENTS

| 4,013,296 | 3/1977 | Keeney | 274/42 R |
| 4,133,540 | 1/1979 | Torrington | 274/9 B |
| 4,159,827 | 7/1979 | Torrington | 274/9 B |
| 4,164,782 | 8/1979 | Stewart | 360/133 |

*Primary Examiner*—Steven L. Stephan
*Attorney, Agent, or Firm*—E. M. Whitacre; J. S. Tripoli; D. A. Kulkarni

[57] ABSTRACT

A disc record caddy comprises a jacket having an edge opening in communication with a record enclosing cavity, and a record retaining spine subject to insertion into the jacket. The spine defines a first portion forming a closure for the edge opening, and a further portion having a perimetrical wall defining an opening in which the enclosed record is received. A portion of the perimetrical wall disposed between the enclosed record and the closure portion of the spine defines a molded-in recess for selectively receiving a peripheral portion of the enclosed record.

1 Claim, 9 Drawing Figures

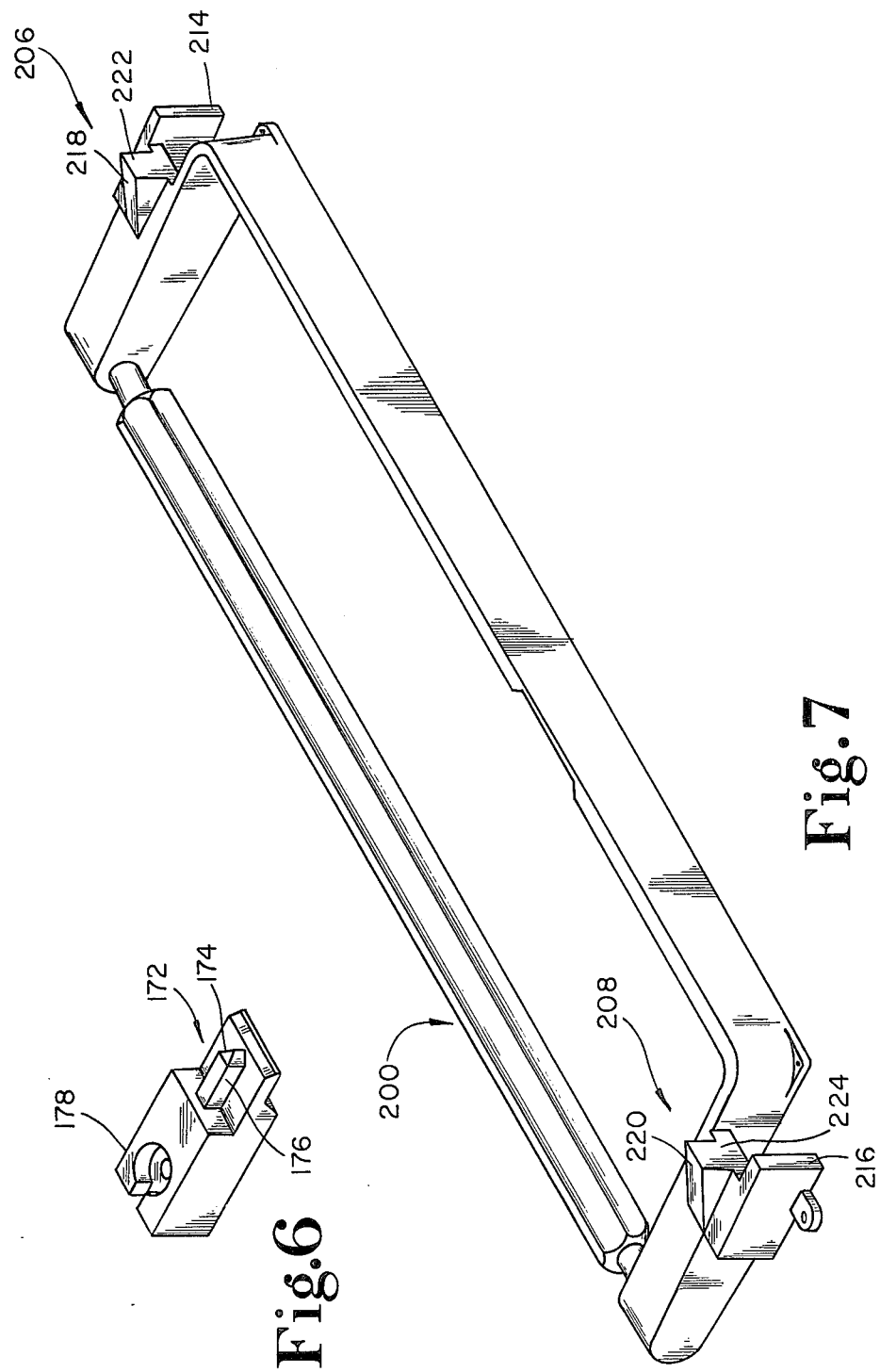

VIDEO DISC CADDY HAVING DISC ENTRAPMENT

This invention relates to a protective caddy for a video disc. More particularly, it relates to a video disc caddy suitable for use with player mechanisms which allow loading of a record into the player and its subsequent retrieval therefrom without having the user touch the record.

In certain video disc systems, information is stored on a disc record in the form of geometric variations in a continuous spiral groove disposed on the record surface. The variations in capacitance between an electrode carried by a groove-riding stylus and a conductive property of the record are sensed to reproduce the stored information. A capacitance-type video disc system is illustratively disclosed in U.S. Pat. No. 3,842,194 (Clemens).

In such systems, it is beneficial to enclose the video disc record in a thin plastic caddy which comprises a jacket and a record retaining spine removably located therein in order to protect the record. The spine, in turn, consists of a closure portion and a further portion having an opening for receiving the enclosed record. For record loading, a full caddy is inserted into an input slot provided in the player. When the caddy arrives at the fully inserted position in the player, a record extracting mechanism disposed therein locks the spine to the player and releases the spine from the jacket, whereby the record/spine assembly is removed from the jacket and retained in the player during subsequent jacket withdrawal. The player is equipped with a platform for supporting the retained record/spine assembly. To transfer the retained record to a turntable for playback, the turntable is raised relative to the platform. For subsequent retrieval, the turntable is lowered so that the record is returned back to the platform resting in the record opening disposed in the spine. An empty jacket is thereafter inserted into the player to return the record/spine assembly back into the jacket. Upon full insertion of the jacket into the player, the spine is unlatched from the player and secured to the jacket. Subsequent withdrawal of the caddy from the player effects record removal. Reference is made to U.S. Pat. Nos. 4,159,827 and 4,133,540, issued to L. A. Torrington, for prior art examples of a video disc caddy and a record extracting mechanism suitable for use therewith.

In the above-mentioned type system, it has been discovered that during insertion of an empty jacket into the player for retrieval of the record/spine assembly, the jacket has a tendency to push the record forward, which, in turn, may cause the record to jam between the spine and the jacket. To prevent such occurrences, pursuant to the subject invention, the peripheral wall of the spine defining the record opening therein is provided with a molded-in recess in which the record bead is trapped when the record is pushed forward during the jacket insertion.

IN THE DRAWINGS

FIG. 6 is an inverted perspective view of a spine locating member disposed in the player of FIGS. 3–5;

FIGS. 7 and 8 illustrate the details of the record extracting mechanism of the player of FIGS. 3–5.

Figure 1:
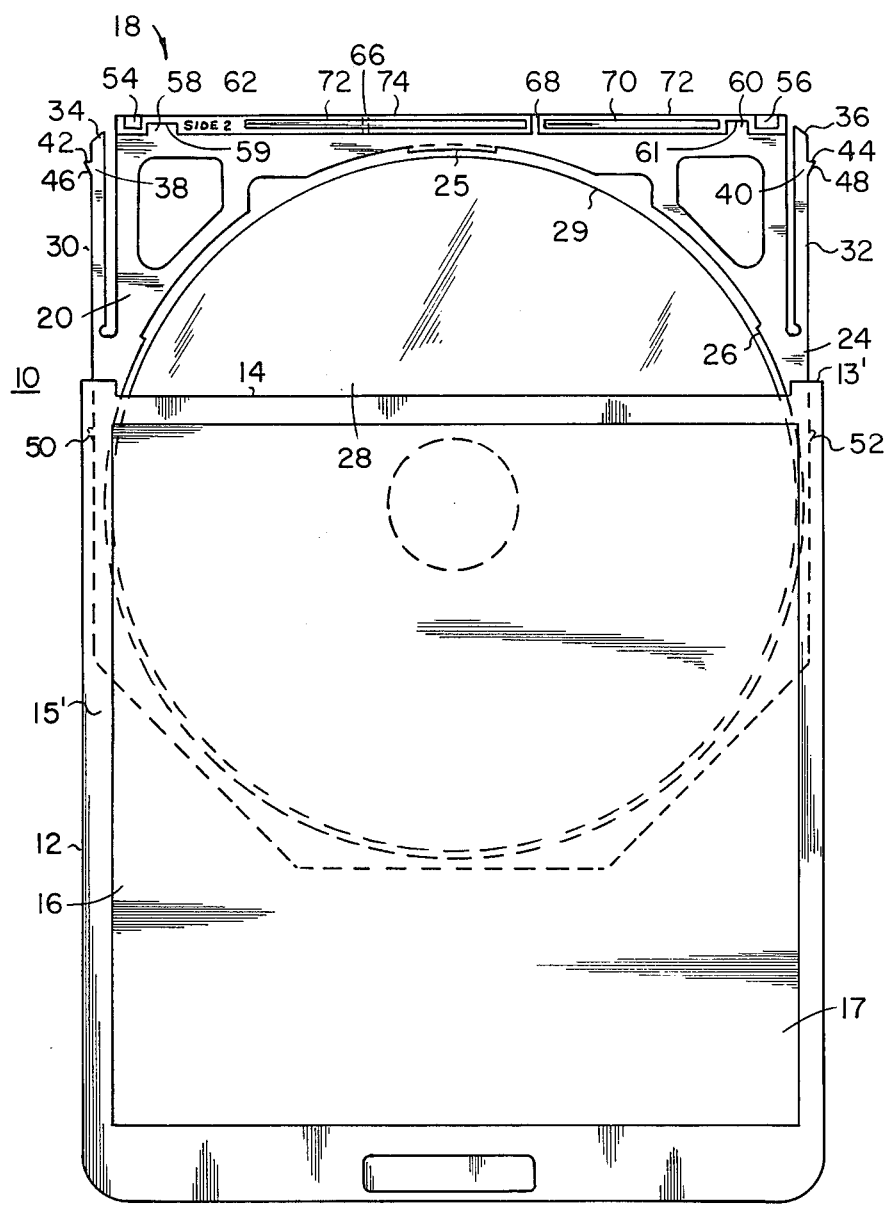
FIG. 1 shows a video disc caddy comprising a jacket and a record retaining spine in accordance with this invention.

As shown in FIG. 1, the video disc caddy 10 comprises a jacket 12 having an edge opening 14 in communication with a record enclosing cavity 16 and a substantially planar, record retaining spine 18 having a major surface 20, and subject to insertion into the jacket along a path. The record retaining spine 18 has a portion 22 which serves as a closure when the spine is fully inserted into the jacket, and a portion 24 having a circular opening 26 for receiving a record 28. The spine 18 is further provided with a pair of integrally-molded, flexural latch fingers 30 and 32, which have free ends 34 and 36 adapted for lateral motion parallel to the major surface of the spine. Each of the spine latch fingers 30 and 32 has a protruding element 38 and 40. Each of the protruding elements 38 and 40 has a square edge 42 and 44, respectively, and an inclined edge 46 and 48, respectively. The protruding elements 38 and 40 are received in pockets 50 and 52 disposed in the jacket 12 for locking the spine 18 in place when it is fully inserted therein.

Figure 2:
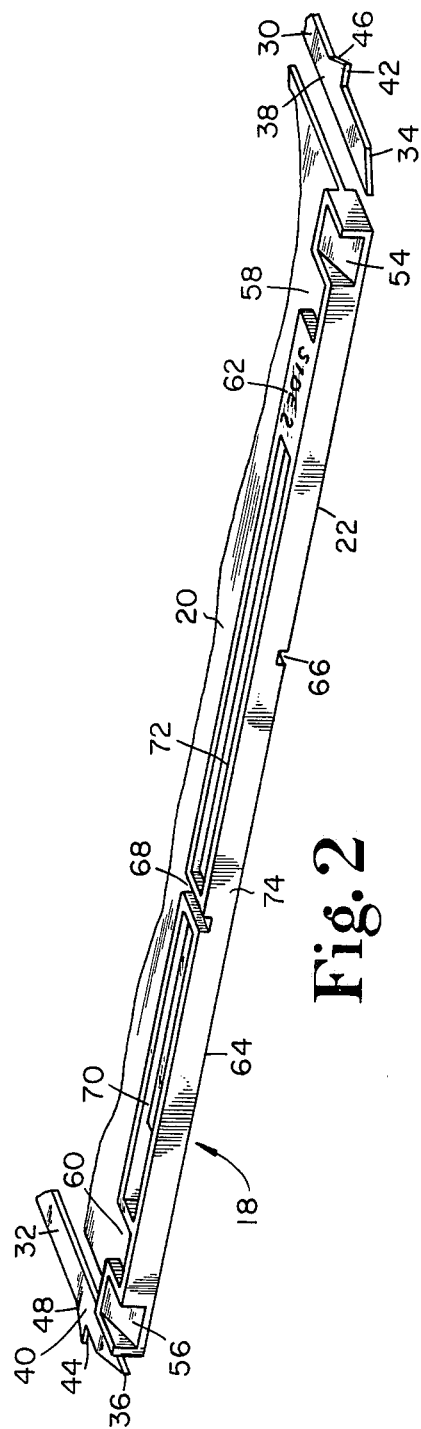
FIG. 2 illustrates a partial perspective view of the record retaining spine of FIG. 1.

As shown in FIG. 2, the record retaining spine 18 is provided with a pair of player side identification ramps 54 and 56, a pair of gripper cutouts 58 and 60, a pair of caddy side identification pads 62 and 64 and a pair of spine locating slots 66 and 68. The details of these features will be later explained in conjunction with the description of the operation of the player. Additionally, recesses 70 and 72 are disposed on sides of the foremost edge 74 of the spine 18 for providing a constant wall thickness in order to prevent occurrence of post molding sink marks.

Figure 3:
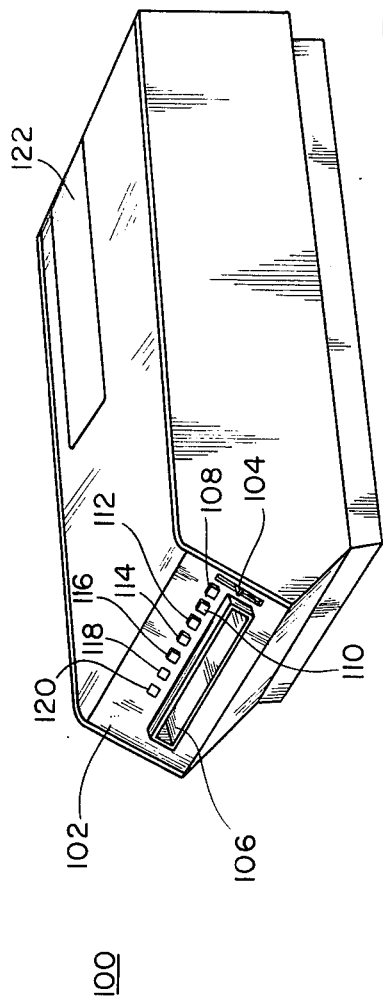
FIG. 3 represents a video disc player incorporating a record extracting mechanism suitable for use with the video disc caddy of FIGS. 1 and 2.

Disposed on the instrument panel 102 of the video disc player 100 is a function lever 104 as shown in FIG. 3. The function lever 104 is subject to disposition in any one of the three positions thereof—"OFF", "PLAY", and "LOAD/UNLOAD". A door flap, not shown, closes the caddy input slot 106 when the function lever 104 is disposed in the OFF and PLAY positions. In the LOAD/UNLOAD position of the function lever 104, the door flap is opened to permit, for example, insertion of a caddy through the input slot to load an enclosed record into the player. A pushbutton 108 is provided to dispose the player in the "PAUSE" mode. A set of pushbuttons 110, 112, 114 and 116 is arranged on the instrument panel 102 to dispose the player in any one of the four "SEARCH" modes, i.e., fast forward/reverse and scan forward/reverse. A digital readout 118 provides indication of playing time and other functions, such as, PAUSE, LOAD and END. A pair of tally lights 120 are operated to provide indication of the record side subject to play, e.g., "SIDE 1" and "SIDE 2". An access door 122 is disposed on the cover of the player to provide access to a stylus cartridge.

Figure 4:
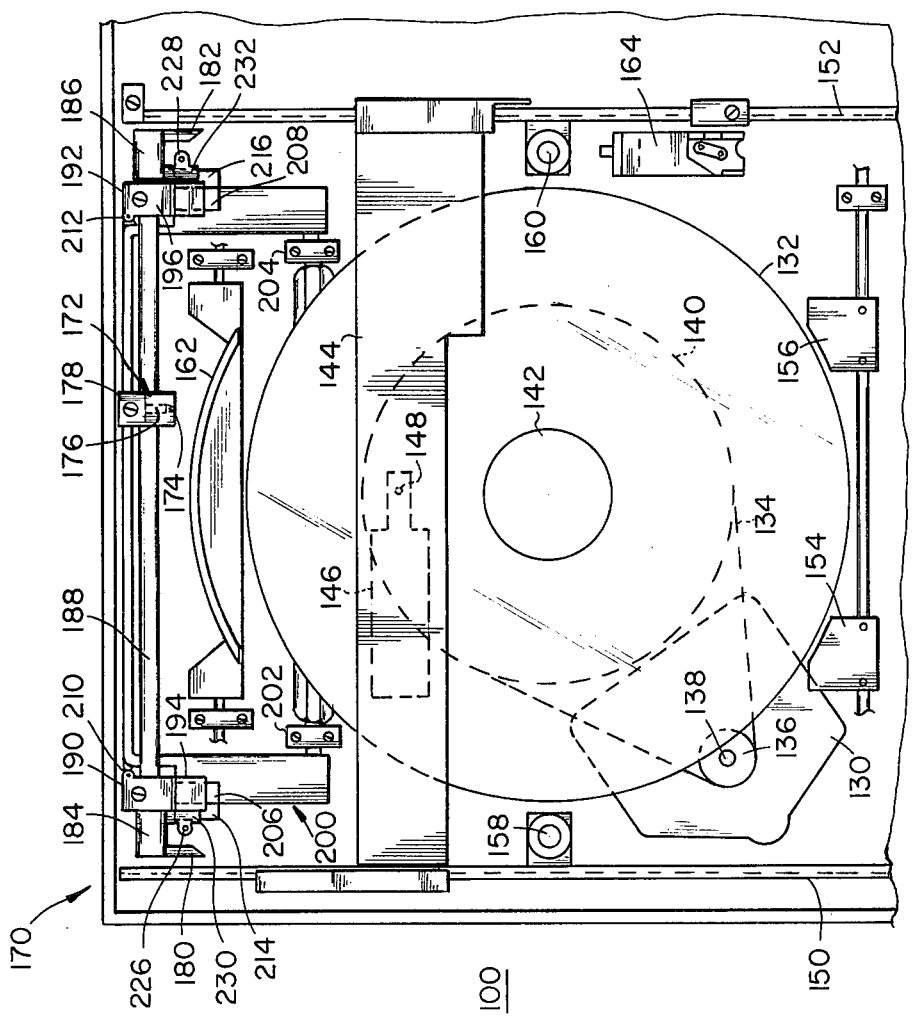
FIG. 4 is a partial plan view of the player of FIG. 3 with its cover removed.

As shown in FIG. 4, the player includes a motor 130 which drives a rotatably-mounted turntable 132 by means of a belt 134 disposed about a pulley 136 mounted on the motor shaft 138 and a flange 140 arranged on the underside of the turntable. A spindle 142 is disposed on the turntable 132 to center a record deposited thereon. A carriage 144, having a compartment for receiving the stylus cartridge 146, is subject to translation during playback from the back of the player toward the turntable spindle 142 in synchronism with the motion of a pickup stylus 148 riding in a spiral information groove disposed on the record.

The player is further equipped with a pair of rails 150 and 152, aligned with input slot 106, for guiding the caddy insertion into the player along a further path. A set of spring-loaded receiver pads 154, 156, 158, 160 and 162 are disposed in the player for supporting the spine and the record therein upon withdrawal of the jacket from the player such that the record/spine assembly is precisely aligned with the centerline of the guide rails 150 and 152.

The player further includes a record side identifying mechanism 164 which operates the SIDE 1/SIDE 2 tally lights 120 on the player instrument panel 102 to provide an indication of the record side subject to play. A concurrently-filed, commonly-assigned, copending application, Ser. No. 098,411, of L. Hughes, entitled RECORD SIDE IDENTIFICATION APPARATUS FOR VIDEO DISC PLAYER, describes details of such record side identifying mechanism.

The player is further equipped with a record extracting mechanism 170 which will be described in detail first. To load a record into the player, the function lever 104 is disposed in the LOAD/UNLOAD position and a stored-in caddy is inserted into the player along the guide rails 150 and 152. The caddy deflects the front receiver pads 154 and 156, the intermediate receiver pads 158 and 160, and the rear receiver pad 162 as it is inserted into the player. The record side identifier 164, in response to the absence or presence of the ramps 54 and 56 on the top side of the spine 18, activates the appropriate one of the tally lights 120, e.g., SIDE 1 or SIDE 2, respectively, during the caddy insertion. The caddy engages the carriage 144 as it is pushed into the player, thereby returning the carriage to the starting position at the rear of the player.

A locating member 172, having a tapered lead-in portion 174 and a base portion 176, is disposed in the player for reception in the appropriate one of the slots 66 and 68 provided in the closure portion 22 of the spine 18 during arrival of the caddy at the fully inserted position in the player in order to accurately locate the spine in the lateral direction in the player. The spine locating member 172 is disposed on a retainer bracket 178 mounted in the player as shown in FIG. 6.

Figure 5:
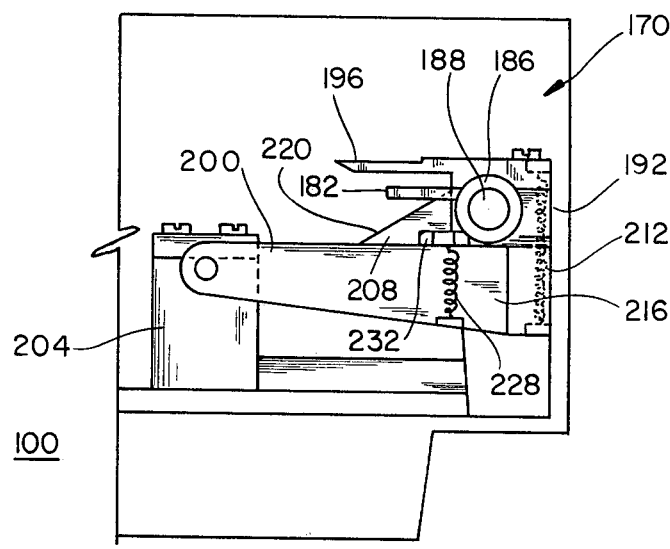
FIG. 5 depicts a partial side view of the player of FIGS. 3 and 4.

As the caddy reaches the fully inserted position in the player, the wedge-like portions of a pair of latch defeat members 180 and 182 enter the jacket to deflect the latch fingers 30 and 32 of the spine 18 to free the spine 18 and the enclosed record 28 from the jacket 12. The latch defeat members 180 and 182 are disposed on a pair of collars 184 and 186 which are fixedly mounted on a shaft 188. The shaft 188 is rotatably mounted in the player by means of a pair of pedestals 190 and 192. A pair of hold-down members 194 and 196 are disposed on the pedestals 190 and 192 to precisely locate the spine 18 in the vertical direction. The relative position of the hold-down member 196 is shown more clearly in FIG. 5.

A gripper arm 200 is pivotally mounted in the player by means of a pair of upstanding supports 202 and 204. Disposed on the gripper arm 200 are a pair of jaw-like gripper members 206 and 208 as shown in FIG. 7. The gripper arm 200 is biased toward the hold-down members 194 and 196 by a pair of coil springs 210 and 212 in the manner indicated in FIG. 5. A pair of ledge portions 214 and 216 disposed on the gripper arm 200 engage the underside of the collars 184 and 186 in order to accurately position the gripper members 206 and 208 and the latch defeat members 180 and 182 in the vertical direction.

As the caddy arrives at the fully inserted position in the player, the foremost edge of the caddy rides up the ramp portions 218 and 220 of the gripper members 206 and 208 to deflect the gripper arm downward until the coil springs 210 and 212 cause the gripper members to snap into the cutouts 58 and 60 disposed in the closure portion 22 of the spine 18 to lock the spine to the player. A pair of leaf springs (not shown) disposed in the player bias the spine such that the engagement between the locating surfaces 222 and 224 of the gripper members 206 and 208 and the locating surfaces 59 and 61 of the cutouts 58 and 60 is ensured. Since the spine 18 is released from the jacket 12 through the operation of the latch defeat members 180 and 182 and latched to the player through the operation of the spine gripper members 206 and 208, subsequent withdrawal of the jacket leaves the spine and the record assembly in the player. The spring loaded lift pads and hold-down members disposed in the player serve to accurately hold the retained spine/record assembly at the correct elevation in the player. The lateral registration of the spine/record assembly in the player is assured by the reception of the locating member 172 in the appropriate one of the cutouts 66 and 68 disposed in the spine 18. The engagement between the locating walls of the gripper members 206 and 208 and the cutouts 58 and 60 disposed in the spine 18 assure the front-to-back alignment of the spine/record assembly in the player.

Figure 8:
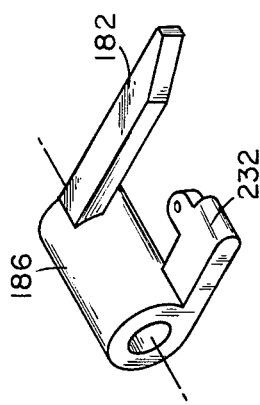

As soon as the latch defeat members 180 and 182 are freed from the jacket during caddy withdrawal, a pair of coil springs 226 and 228 disposed between the gripper arm 200 and the levers 230 and 232 arranged on the collars 184 and 186 cause downward deflection of the latch defeat members. The construction details of the collar 186 are shown in FIG. 8. The construction of the other collar 184 is similar.

To transfer the retained record to the turntable 132 for playback, the function lever 104 is moved to the PLAY position, which, in turn, raises the turntable and starts the turntable motor 130. The turntable 132 picks up the record as it is raised, leaving the spine 18 resting on the receiver pads 154, 156, 158, 160 and 162. The pickup stylus 148 is gently lowered into the spiral information groove on the record and the carriage 144 is translated toward the record center in correlation with the inward motion of the stylus. The recovered signal is processed to reconstruct a composite television signal containing picture and sound information.

To transfer the record back to the receiver pads 154–162, the function lever 104 is moved back to the LOAD/UNLOAD position, which lowers the turntable 132 to a height below the lift pads. To ensure that the record is properly returned into the record opening 26 disposed in the spine 18 as the turntable 132 is lowered, it is important to accurately locate the spine in the player—in the front-to-back, lateral and vertical directions. As previously indicated, the gripper members 206 and 208 assure the front-to-back alignment, the locating member 172 ensures lateral registration and the receiver pads 154–162 provide accurate vertical registration. To provide an indication of the degree of precision involved, consider the following illustrative dimensions—record outside diameter=11.908±0.016 inches, spine opening diameter=11.985±0.015 inches. The caddy and the player mechanisms described herein are capable of functioning with such small clearances.

Figure 9:
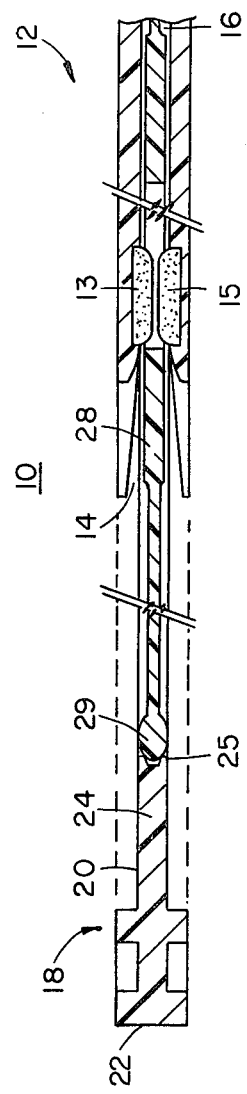
FIG. 9 shows the return of the record/spine assembly back into the jacket when an empty jacket is inserted into the player of FIGS. 3–5.

As shown in FIG. 9, the jacket 12 is provided with a pair of lip pads 13 and 15 to prevent dust and debris from entering into the record enclosing cavity 16 of the jacket and to wipe the dust and debris from the record 28 as it is inserted into the jacket and removed therefrom. Typically, the clearance between the lip pads is 0.020 inches and the record thickness is 0.076 inches. When the empty jacket 12 is inserted into the player to retrieve the record/spine assembly, it thrusts the record 28 forward in the direction of insertion because of interference between the lip pads 13 and 15 and the record. Such forward thrust has a tendency to cause the record 28 to slide over or under the spine 18, which, in turn, may cause the record to jam between the spine and the jacket 12. This condition especially happens if the plane of the disc 28 is not precisely aligned with the plane of the spine 18 and the jacket 12. To prevent such jams, in accordance with the instant invention, the peripheral wall of the spine 18 defining the record opening 26 is provided with a molded-in pocket 25 in which the record bead 29 is trapped when the record is thrust forward during the jacket insertion.

To retrieve the record from the player, an empty jacket 12 is inserted into the player through the input slot 106 along the guide rails 150 and 152. As the jacket 12 arrives at the fully inserted position in the player, the front edge thereof engages the deflected latch defeat members 180 and 182 to cause further downward deflection thereof. During such further downward deflection, the levers 230 and 232 disposed on the collars 184 and 186 bear upon the ledge positions 214 and 216 disposed on the gripper arm 200 to effect downward displacement thereof, whereby the spine 18 is released from the gripper arm. When the jacket 12 is fully inserted into the player, the spine latch fingers 30 and 32 snap back into the recesses 50 and 52 to lock the spine 18 to the jacket and the record/spine assembly is thus retrieved when the caddy is withdrawn.

Certain features of the caddy, such as spine lateral locking mechanism, lateral locating slots, etc., are the subject matter of a concurrently-filed, commonly-assigned, copending U.S. patent application, Ser. No. 098,412, of L. A. Torrington et al., entitled "VIDEO DISC CADDY".

What is claimed is:

1. A disc record caddy for use with a record player; said caddy comprising a jacket having an edge opening in communication with a record enclosing cavity and a record retaining spine subject to insertion into said jacket; said spine defining a first portion forming a closure for said edge opening, and a further portion having a perimetrical wall defining an opening in which the enclosed record is received to form a record/spine assembly; said player having an input slot through which an occupied caddy is inserted along a path to load said enclosed record therein; said player including a record extracting mechanism for removing said retaining spine from said jacket during jacket withdrawal subsequent to an occupied caddy arrival at a fully inserted position in said player, thereby retaining said record/spine assembly in said player resting on a record supporting platform; said record receiving opening in said spine being larger than said record for allowing free passage of said record therethrough to permit transfer of said retained record from said platform to a record turntable for playback, and from said turntable to said platform to redefine said record/spine assembly for record retrieval; an empty jacket being inserted into said player along said path for retrieving said retained record/spine assembly into said jacket for record removal; a portion of said perimetrical wall, disposed between said enclosed record and said closure portion of said spine, defining a recess, which is located such that a peripheral portion of said enclosed record is urged into said recess by said empty jacket, as said empty jacket is inserted into said player for record retrieval, to confine said record to said record receiving opening in said spine during such insertion to assure proper record retrieval.

* * * * *